United States Patent [19]

Sugita et al.

[11] Patent Number: 5,229,951

[45] Date of Patent: Jul. 20, 1993

[54] APPARATUS FOR MACHINING A NON-CIRCULAR WORKPIECE

[75] Inventors: Kazuhiko Sugita, Anjo; Norio Sakakibara, Kariya; Nobumitsu Hori, Ichinomiya; Yoichi Yamakawa, Aichi, all of Japan

[73] Assignee: Toyoda Koki Kabushiki Kaisha, Kariya, Japan

[21] Appl. No.: 588,940

[22] Filed: Sep. 27, 1990

[30] Foreign Application Priority Data

Sep. 27, 1989 [JP] Japan ................... 1-250914
Dec. 4, 1989 [JP] Japan ................... 1-314819

[51] Int. Cl.$^5$ ........................................... G06F 15/46
[52] U.S. Cl. .................... 364/474.29; 364/474.31; 364/474.36; 82/118
[58] Field of Search .............. 364/474.28, 474.29, 364/474.30, 474.31, 474.36, 474.06; 318/568, 570, 573; 82/18, 118

[56] References Cited

U.S. PATENT DOCUMENTS

| 4,203,062 | 5/1980 | Bathen . |
| 4,343,206 | 8/1982 | Douglass et al. . |
| 4,646,595 | 3/1987 | Slee . |
| 4,791,575 | 12/1988 | Watts, Jr. et al. . |
| 4,992,711 | 2/1991 | Sugita et al. .................... 318/573 |
| 5,031,107 | 7/1991 | Suzuki et al. .................... 364/474.29 |
| 5,054,340 | 10/1991 | Sugita et al. .................... 82/118 |
| 5,060,164 | 10/1991 | Yoneda et al. .................... 364/474.29 |

FOREIGN PATENT DOCUMENTS

| 0381155 | 8/1990 | European Pat. Off. . |
| 0383328 | 8/1990 | European Pat. Off. . |
| 58-10441 | 1/1983 | Japan . |
| 59-169753 | 9/1984 | Japan . |
| 59-182003 | 10/1984 | Japan . |
| 61-8203 | 1/1986 | Japan . |
| WO87/00646 | 1/1987 | PCT Int'l Appl. . |

Primary Examiner—Jerry Smith
Assistant Examiner—Thomas E. Brown
Attorney, Agent, or Firm—Oblon, Spivak, McClelland, Maier & Neustadt

[57] ABSTRACT

An apparatus for machining a non-circular workpiece, wherein the profile data of plural sections of the workpiece stored in the profile data storage means are transformed into the frequency functions of 1 to n degree which is a function of the rotary angular velocity of the workpiece. The calculation means finds the amplitudes and the phases of each degree of the frequency function of each of plural intermediate sections by means of the interpolation according to the position between selected two sections based on the frequency functions of the selected two sections so as to obtain high frequency functions and low frequency functions which are then converted to high frequency and low frequency profile data. The machining apparatus actuates a linear motor in accordance with the high frequency profile data and actuates a PZT actuator in accordance with the low frequency profile data. The actuations of these actuators are accomplished in a synchronized relationship with the rotation of the workpiece to machine the workpiece into a non-circular shape whose sectional shape changes with respect to its axial position.

8 Claims, 12 Drawing Sheets

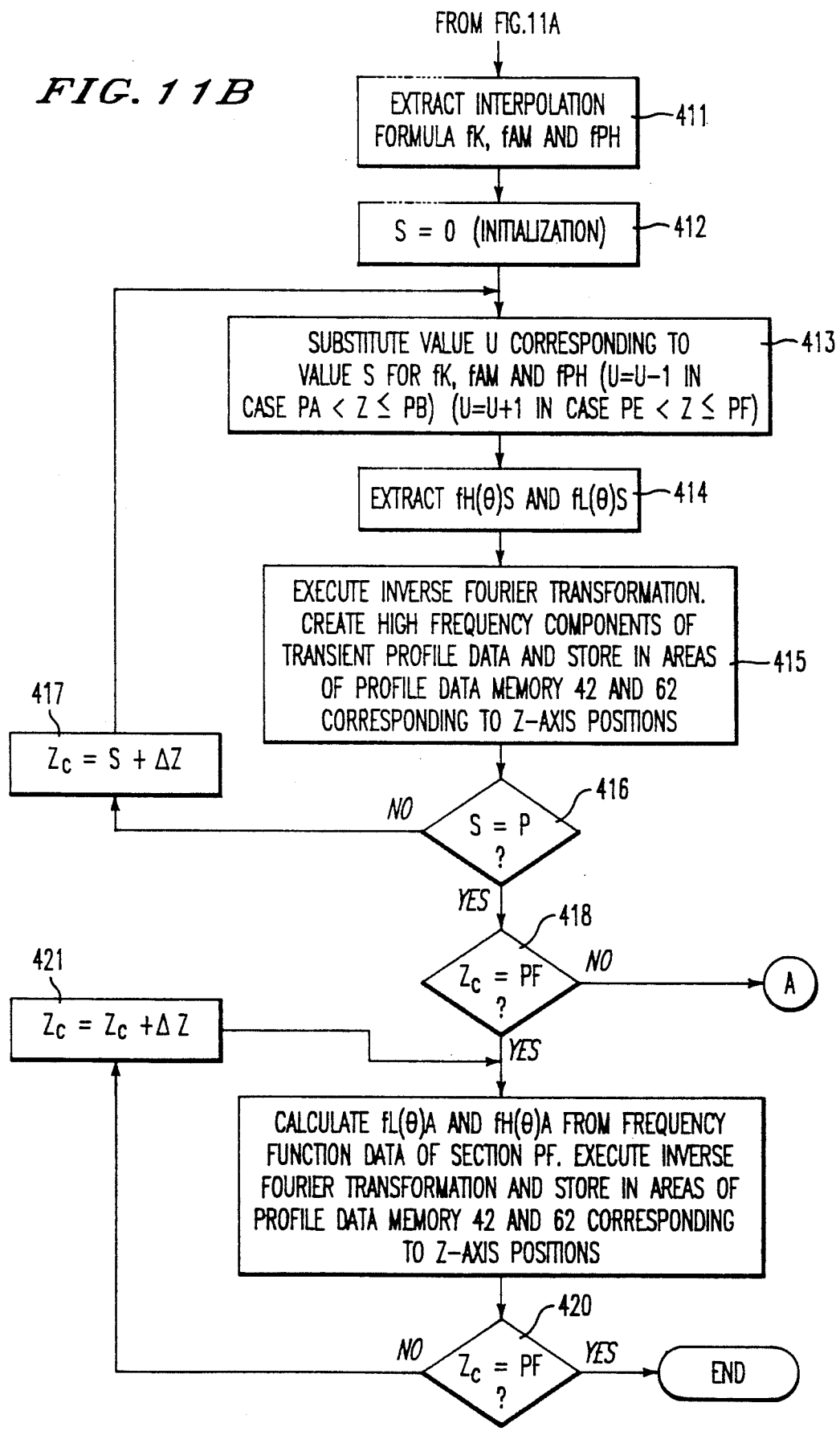

| | |
|---|---|
| Z0 | PROFILE DATA OF SECTION PA |
| Z1 | PROFILE DATA OF INTERMEDIATE SECTION AT POSITION Z1 (Z1 = Z0 + ΔZ) |
| Z2 | PROFILE DATA OF INTERMEDIATE SECTION AT POSITION Z2 (Z2 = Z1 + ΔZ) |
| Z3 | |

| | |
|---|---|
| Z0 | PROFILE DATA OF SECTION PA |
| Z1 | PROFILE DATA OF INTERMEDIATE SECTION AT POSITION Z1 (Z1 = Z0 + ΔZ) |
| Z2 | PROFILE DATA OF INTERMEDIATE SECTION AT POSITION Z2 (Z2 = Z1 + ΔZ) |
| Z3 | |

APPARATUS FOR MACHINING A NON-CIRCULAR WORKPIECE

BACKGROUND OF THE INVENTION

This invention relates to an apparatus for machining a non-circular workpiece wherein a workpiece is rotated at a constant angular velocity ω and a cutting tool is moved in a direction perpendicular to the rotational axis of the workpiece and a direction parallel to the rotational axis in a synchronized relationship with rotation of the workpiece so that the workpiece may be machined into a non-circular shape whose sectional shape changes along the rotational axis.

In case that a difference between major and minor diameters of a workpiece is constant at all positions along the rotational axis of the workpiece, only one set of non-circular profile data (hereinafter referred to as profile data), which defines a sectional shape perpendicular to the rotational axis of the workpiece, is required to be prepared. In this case, profile data of other sections can be calculated based on the prepared profile data with taking the major and minor diameters of each section into consideration.

However, prior apparatus for machining the non-circular workpiece wherein profile data of a predetermined section of the workpiece is stored and the profile data of the other sections are created based upon the periodicity of the sectional shape has a problem in that the apparatus cannot machine the workpiece whose difference between the major and the minor diameter doesn't vary constantly with respect to the axial position along the rotational axis of the workpiece and the workpiece which twists with respect to the axis of the workpiece, because the profile data of the other sections cannot be created by the calculation based on the stored profile data for the predetermined section of the workpiece.

SUMMARY OF THE INVENTION

An object of the invention is to provide an apparatus for machining a non-circular workpiece whose sectional shape changes with respect to its axial position, which can easily create profile data of intermediate sections between multiple sections profile data of which are known.

Another object of the invention is to provide an apparatus for machining a non-circular workpiece whose sectional shape changes with respect to its axial position, in which the responsiveness of the tool feed is improved.

For the purpose of attaining the above objects, according to the invention, there is provided an apparatus for machining a non-circular workpiece wherein a workpiece is rotated at a constant angular velocity ω and a cutting tool is moved in a synchronized relationship with the rotation of the workpiece in a direction perpendicular to the rotational axis of the workpiece and a direction parallel to the rotational axis so that the workpiece may be machined into a non-circular shape whose sectional shape changes with respect to its axial position, said apparatus comprising: a first data storage means for storing therein non-circular profile data of plural sections perpendicular to the rotational axis of a workpiece, the plural sections being apart each other in the rotational axis of the workpiece, a data transformation means for transforming the stored non-circular profile data into frequency functions of 1 to n degree which is a function of the angular velocity, a calculation means for finding amplitudes and phases of frequency functions of 1 to n degree for plural intermediate sections by means of an interpolation according to their positions between the sections based on the amplitude and the phase of the each degree of the frequency function of the each section and for separating the frequency function of the intermediate sections into low frequency functions and high frequency functions, a data inverse transformation means for transforming inversely each of the high frequency functions and the low frequency functions calculated by the calculation means to create high frequency profile data composing the high frequency components and low frequency profile data composing the low frequency components, a second data storage means for storing therein the high frequency and low frequency profile data created by the data inverse transformation means, a first driving system driven by the high frequency profile data stored by the second profile data storage means to move a cutting tool, and a second driving system driven by the low frequency profile data stored in the second data storage means to move a cutting tool.

According to the machining apparatus, the profile data of predetermined plural sections of the workpiece stored in the profile data storage means are transformed into the frequency function of 1 to n degree which is a function of the rotary angular velocity ω of the workpiece. The calculation means finds the amplitudes and the phases of frequency functions of 1 to n degree for plural intermediate sections by means of the interpolation according to their positions between the predetermined sections based on the amplitude and the phase of the each degree and separates the frequency functions into the high frequency functions and the low frequency functions. The high frequency functions and the low frequency functions calculated by the calculation means are converted to the high frequency profile data and the low frequency profile data, respectively. The profile data are stored in the second profile data storage means. The non-circular workpiece machining apparatus actuates the first driving system in accordance with the high frequency profile data stored in the second profile data storage means and the second driving system in accordance with the high frequency profile data stored in the second profile data storage means. The actuation of the first and second driving system is accomplished in a synchronized relationship with the rotation of the workpiece. With this operation, the workpiece is machined into a non-circular shape by the combined actuation of the both driving systems.

Other and further objects, features and advantages of the invention will become appear more fully from the following description.

BRIEF DESCRIPTION OF THE DRAWINGS

FIG. 11(A) and FIG. 11(B) are flow charts illustrating creation of the intermediate profile data by means of the spline interpolation.

FIGS. 12A and 12B are explanatory views illustrating a portion of the profile data stored in a profile data memory.

DESCRIPTION OF THE INVENTION

Figure 1:
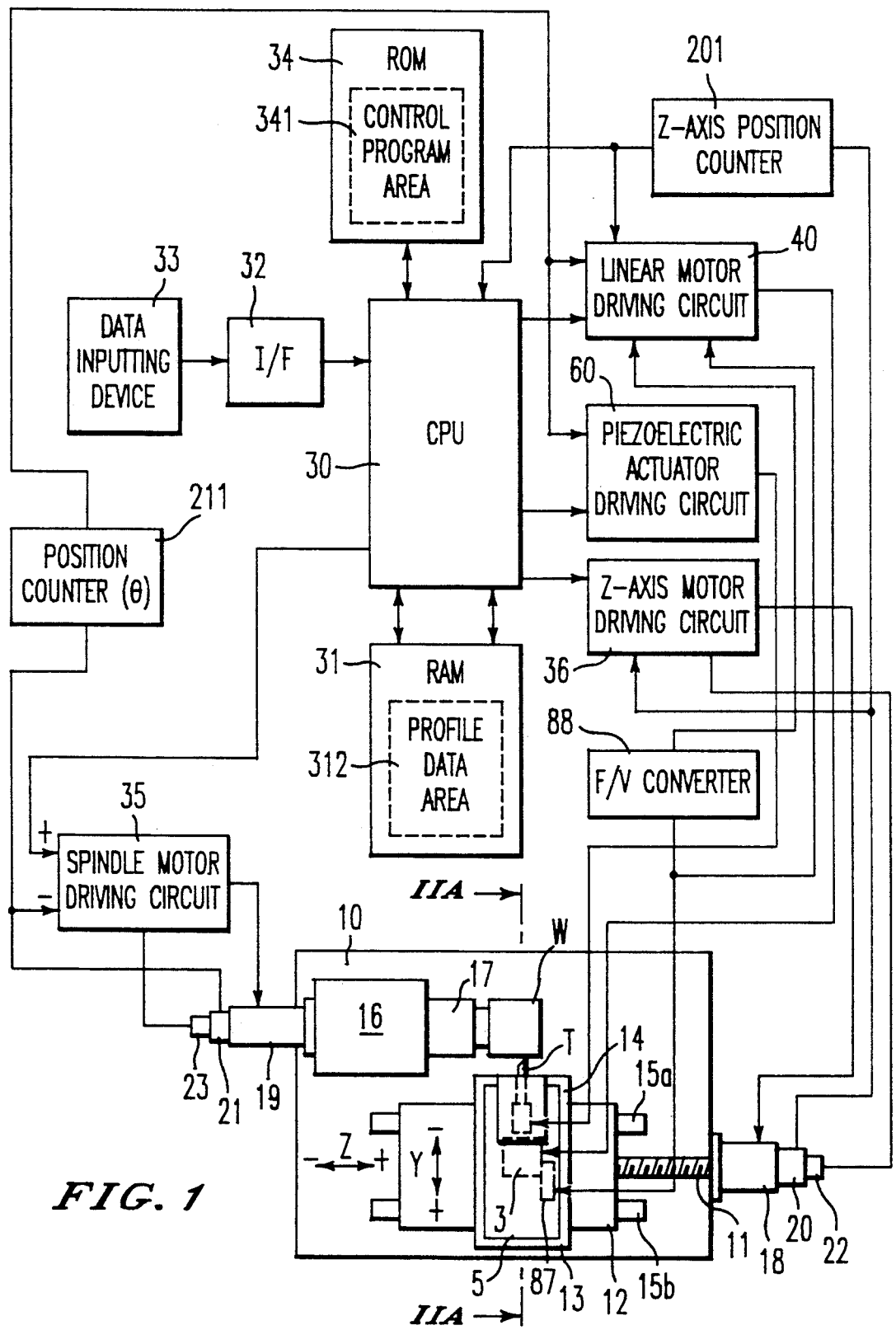
FIG. 1 is a diagrammatic representation showing an entire construction of a machining apparatus according to the present invention.

Referring first to FIG. 1, there is shown a mechanical construction of a non-circular workpiece machining apparatus according to a preferred embodiment of the present invention. The machining apparatus shown includes a bed 10 and a pair of slide rails 15a and 15b formed on the bed 10 and extending in the direction of a Z-axis. A tool slide 12 is disposed for sliding movement in the Z-axis direction on the slide rails 15a and 15b and connected to a Z-axis motor 18 in the form of a servomotor via a feed screw mechanism 11. A tool base 13 is placed on the tool slide 12, and a cutting tool T and an X-axis tool feeding mechanism 14 are placed on the tool base 13. The cutting tool T is moved back and forth in the X-axis direction by the tool feeding mechanism 14 which will be hereinafter described. An amount of rotation of the Z-axis motor 18 is detected by a rotary encoder 20, and a detection signal of the rotary encoder 20 is fed back as a position feedback signal to a Z-axis motor driving circuit 36. The detected signal of the rotary encoder 20 is also counted by a Z-axis counter 201 and the count value is inputted to CPU30, a linear motor driving circuit 40 and a piezoelectric actuator driving circuit 60. Meanwhile, a speed of rotation of the Z-axis motor 18 is detected by a tachometer generator 22, and a detection signal of the tachometer generator 22 is fed back as a speed feedback signal to the Z-axis motor driving circuit 36.

A spindle head 16 is disposed on the bed 10, and a spindle 17 is supported for rotation on the spindle head 16. The spindle 17 is rotated by a spindle motor 19 in the form of a servomotor. A workpiece W such as a piston for an engine is attached to the spindle 17 by means of a chuck not shown and fitted on a positioning pin not shown which extends from the spindle 17. As a result, the phase of rotation of the workpiece W coincides with the phase of rotation of the spindle 17. An amount of rotation of the spindle motor 19 is detected by a rotary encoder 21, and a detection signal of the rotary encoder 21 is fed back as a position feedback signal to a spindle motor driving circuit 35. The detected signal of the rotary encoder 21 is counted by a position counter 211 and the count value is inputted to the linear motor driving circuit 40 and the piezoelectric actuator driving circuit 60. Meanwhile, a speed of rotation of the spindle motor 19 is detected by a tachometer generator 23, and a detection signal of the tachometer generator 23 is fed back as a speed feedback signal to the spindle motor driving circuit 35.

With the apparatus, when the spindle 17 is rotated, the cutting tool T is moved back and forth in the X-axis direction in a synchronized relationship with rotation of the spindle 17 so that the workpiece W may be machined so as to have a predetermined substantially elliptic cross section. In a combined or overlapping relationship with the machining movement, the tool slide 12 is fed in the Z-axis direction by the Z-axis motor 18 so that the workpiece W may be machined also in the Z-axis direction. Consequently, the workpiece W is machined into a desired cylindrical shape.

Figure 2A:
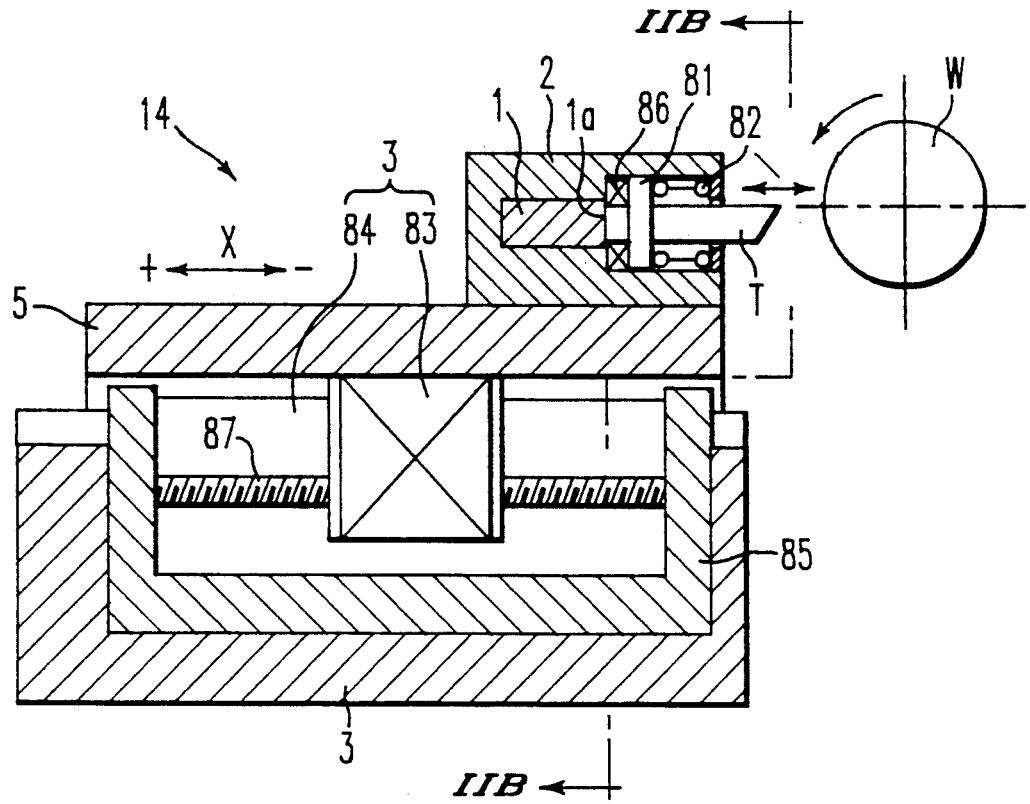
FIGS. 2A and 2B are sectional views showing an X-axis tool feeding mechanism of the machining apparatus shown in FIG. 1.
Figure 2B:
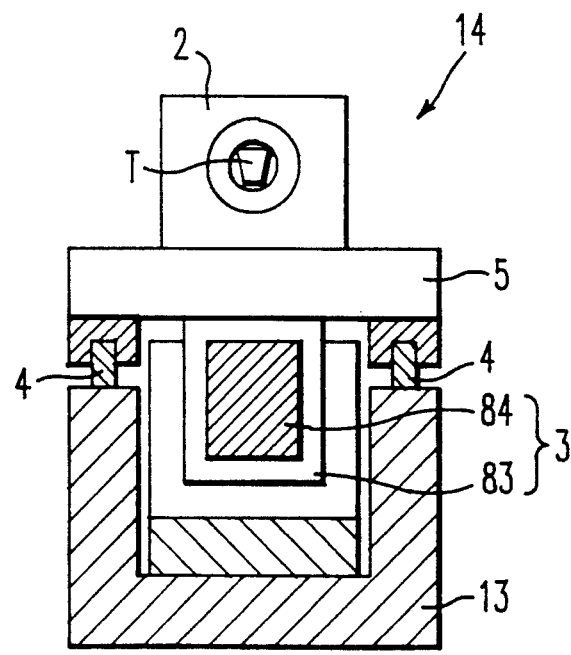
Figure 3A:
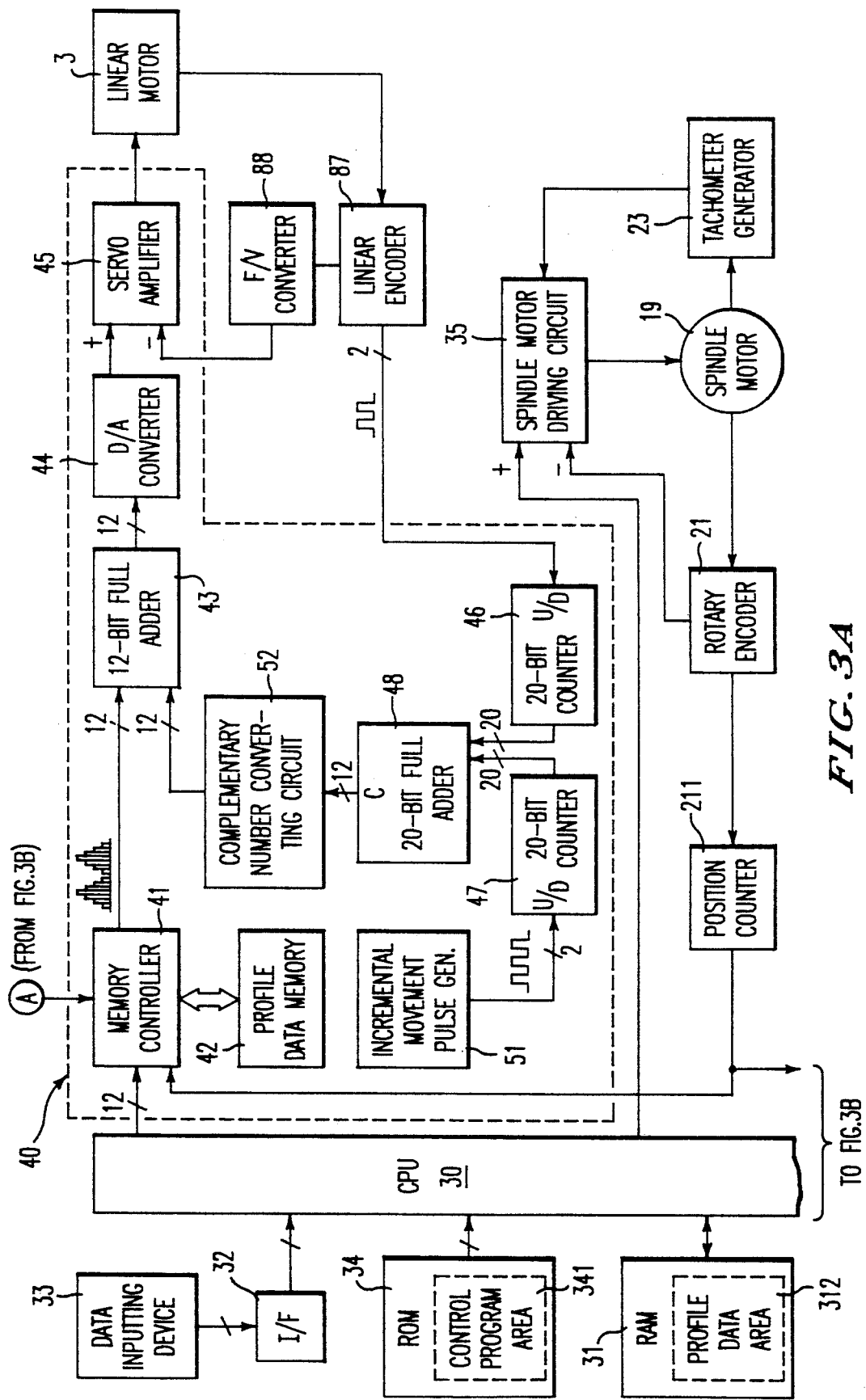
FIGS. 3A and 3B are block diagrams showing an electric construction of the apparatus shown in FIG. 2.
Figure 3B:
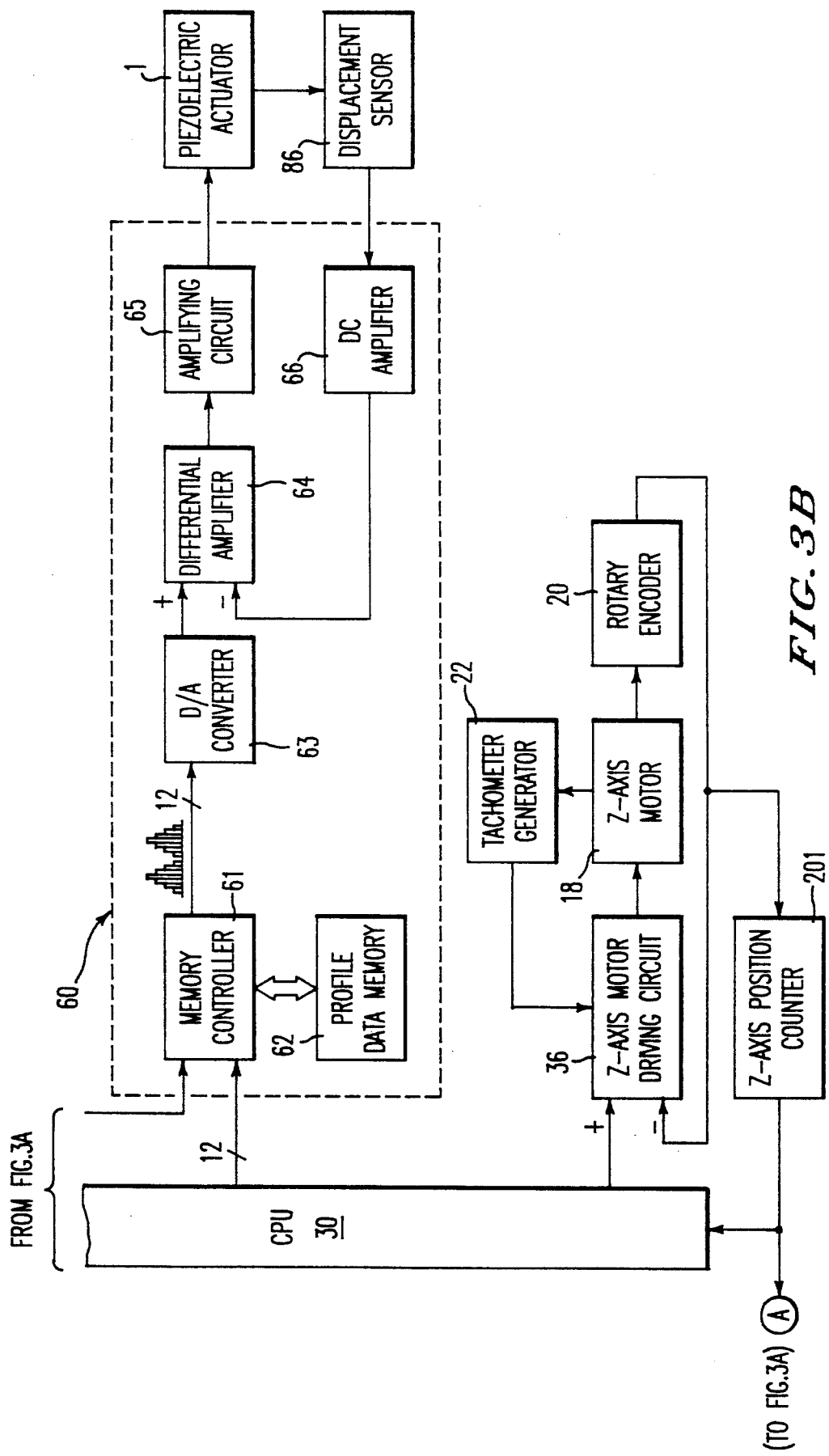

The X-axis tool feeding mechanism 14 is shown in detail in FIGS. 2A and 2B which are sectional views thereof taken in directions parallel and perpendicular to the X-axis, respectively. Referring to FIGS. 2A and 2B, the cutting tool T is mounted on a tool mount 2. A piezoelectric actuator 1 made of PZT (lead zirconate titanate) is disposed in the inside of the tool mount 2. A holder 81 for the cutting tool T is normally held in contact at an end face thereof with an end face 1a of the piezoelectric actuator 1 under the biasing force exerted by a compression coil spring 82. When a voltage is applied to the piezoelectric actuator 1, the end face 1a of the piezoelectric actuator 1 is displaced by an amount corresponding to the magnitude of the voltage applied thereto in the direction indicated by an arrow mark of the X-axis direction against the biasing force of the coil spring 82. As a result, the position of the cutting tool T in the X-axis direction with respect to the tool mount 2 is controlled in accordance with the magnitude of the voltage applied to the piezoelectric actuator 1. The amount of displacement of the piezoelectric actuator 1 with respect to the tool mount 2 is detected by an eddy-current displacement sensor 86 provided in the tool mount 2. A signal detected by the displacement sensor 86 is transmitted as a position feedback signal to the piezoelectric actuator driving circuit 60 (FIG. 3).

The tool mount 2 is securely mounted on a tool mount table 5. The tool mount table 5 is disposed for sliding movement in the X-axis direction with respect to the tool base 13 under the guidance of a pair of linear guides 4 provided on the opposite sides along the length of the tool base 13. An armature 83 of the linear motor 3 is securely mounted on a lower face of the tool mount table 5. A stator 84 extends in the X-axis direction through the armature 83 and is supported at the opposite ends thereof on the tool base 13 by means of a holding member 85. When the armature 83 and the stator 84 are energized, an electromagnetic force is generated between the armature 83 and the stator 84 so that the armature 83 is moved in the X-axis direction with respect to the stator 84. Upon such movement of the armature 83, the tool mount table 5 is slidably moved in the X-axis direction with respect to the tool base 13. The amount and speed of the movement of the tool mount table 5 in the X-axis direction with respect to the tool base 13 are detected by a linear encoder 87 and a frequency to voltage (F/V) converter 88 (FIG. 3) for converting an output of the linear encoder 87 from a frequency into a voltage. A signal detected by the linear encoder 87 is transmitted as a position feedback signal while a signal detected by the F/V converter 88 is transmitted as a speed feedback signal to a linear motor driving circuit 40 (FIG. 3).

Figure 4:
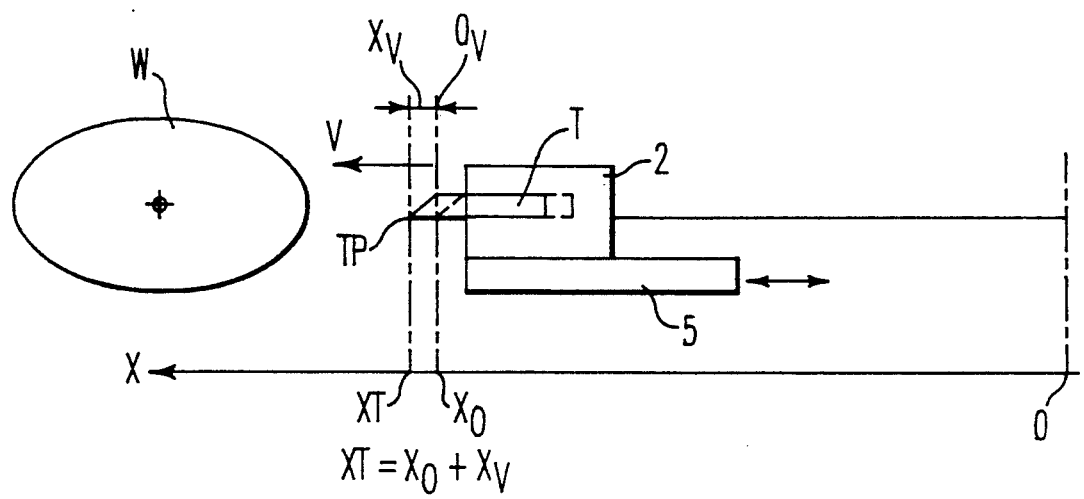
FIGS. 4 and 5 are diagrams illustrating movement of a tool.

Referring now to FIG. 4, the absolute position of the cutting tool T is represented by the position XT of an end TP of the tool T. Meanwhile, the position of the tool end TP which is projected by a predetermined reference length with respect to the tool mount 2 is defined as the origin (hereinafter referred to as tool origin) Ov, and a coordinate system Ov-V having an axis V parallel to the X-axis (the coordinate system will be hereinafter referred to as tool coordinate) is fixed on the tool mount 2. The position of the tool origin Ov on the X-axis (hereinafter referred to as tool origin position) is represented by Xo while the position of the tool end TP indicated on the tool coordinate Ov-V (hereinafter referred to as relative end position) is represented by Xv. Using Xo and Xv, XT is calculated in accordance with the following equation:

$$XT = Xo + Xv \quad (1).$$

It is to be noted that the tool origin position Xo is controlled by the linear motor 3 while the relative end position Xv is controlled by the piezoelectric actuator 1.

Figure 6:
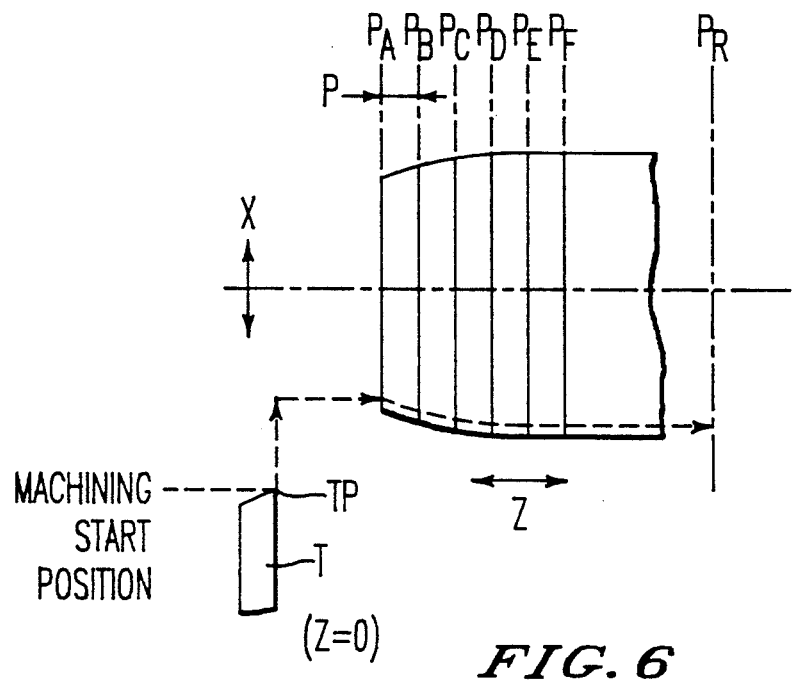
FIG. 6 is an explanatory view showing a workpiece to be machined and the movement of the tool.
Figure 10:
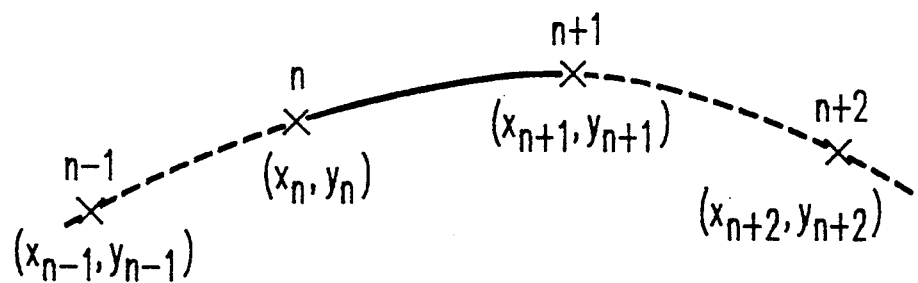
FIG. 10 is an illustration for explaining a method of a spline interpolation for use with a mixed function.

Referring now to FIGS. 1 and 3, an electric construction of the machining apparatus is shown. The machining apparatus includes a central processing unit (hereinafter referred to as "CPU" 30, and a ROM 34 and a RAM 31 both connected to the CPU 30. The ROM 34 has formed therein a control program area 341 in which a control program for controlling the machining apparatus is stored in advance while the RAM 31 has formed therein a profile data area 312 for storing therein profile data for moving the cutting tool T back and forth in accordance with an outer profile of a workpiece W. The profile data are stored for each of the sections $P_A$ to $P_F$ of the fixed pitches P, as shown in FIG. 6.

Figure 5:
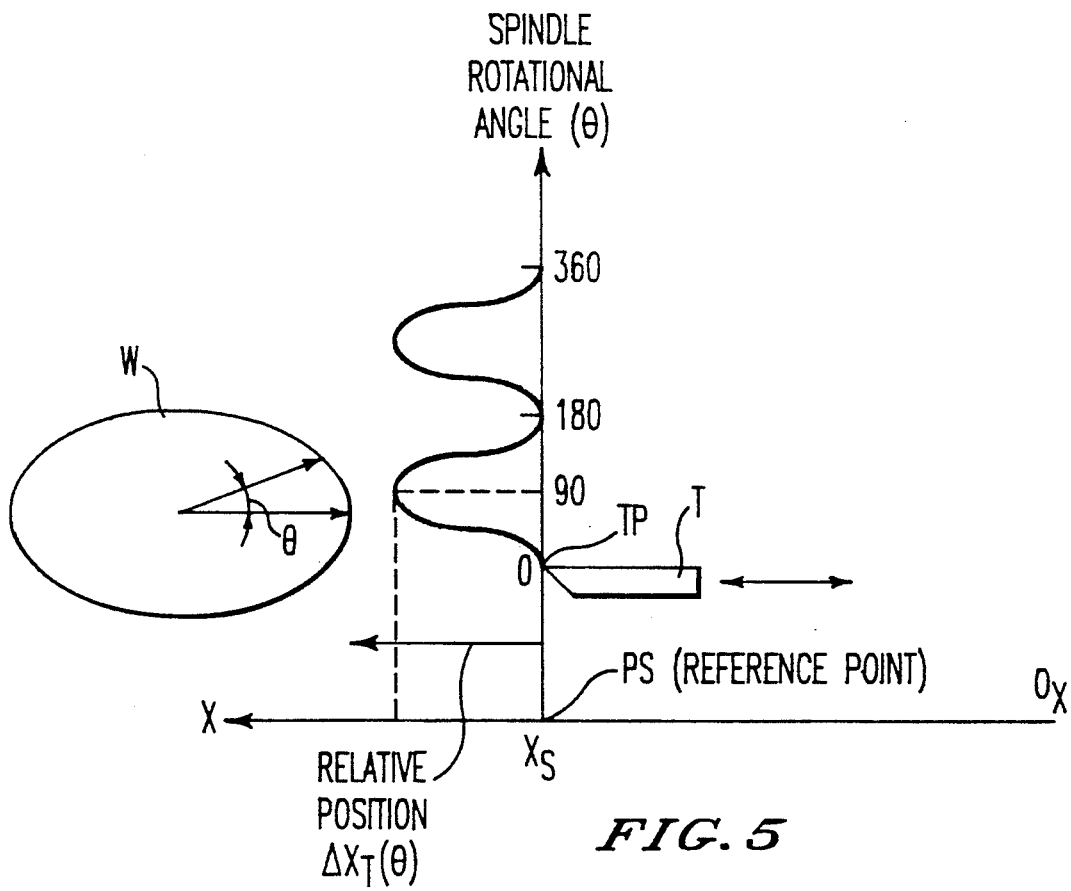

Referring now to FIG. 5, each of such profile data indicates a relative position $\Delta XT(\theta)$ of the tool end TP which varies in a synchronized relationship with an angle $\theta$ of rotation of the spindle 17 with respect to a reference point PS. In particular, a relative position $\Delta XT(\theta)$ of the tool end TP is represented in an equation given below using a movably set position (hereinafter referred to as reference position) Xs of the reference point PS on the X-axis. It is to be noted that the reference position Xs does not vary in a synchronized relationship with rotation of the spindle 17. However, the reference position Xs can vary along the Z-axis.

$$\Delta XT(\theta) = XT(\theta) - Xs \quad (2).$$

Here, the reference position Xs is controlled by the linear motor 3 while the relative position $\Delta XT(\theta)$ is controlled by both of the linear motor 3 and the piezoelectric actuator 1.

Accordingly, the relative position $\Delta XT(\theta)$ is decomposed into a component $\Delta XTL(\theta)$ which is controlled by the linear motor 3 and another component $\Delta XTp(\theta)$ which is controlled by the piezoelectric actuator 1. In particular, the following equation stands:

$$\Delta XT(\theta) = \Delta XT_L(\theta) + \Delta XT_P(\theta) \quad (3)$$

Further, in case the position of the tool end TP is controlled in a synchronized relationship with rotation of the spindle 17, each of the positions Xo and Xv defined hereinabove makes a function of the angle $\theta$ of rotation, and the equation (1) given hereinabove can be rewritten with a function of $\theta$ into the following equation:

$$XT(\theta) = Xo(\theta) + Xv(\theta) \quad (4)$$

Accordingly, the following equation can be derived from the equations (2) and (4):

$$\Delta XT(\theta) = Xo(\theta) - Xs + Xv(\theta) \quad (5)$$

The following equations can be derived from the equations (3) and (5):

$$\Delta XT_L(\theta) = Xo(\theta) - Xs \quad (6)$$

$$\Delta XT_P(\theta) = Xv(\theta) \quad (7)$$

Thus, each profile data $\Delta XT_L(\theta)$ assigned to the linear motor 3 is represented by a deviation of the tool origin position $Xo(\theta)$ with respect to the reference position Xs. Meanwhile, each profile data $\Delta XT_P(\theta)$ assigned to the piezoelectric actuator 1 is represented by an aforementioned relative end position $Xv(\theta)$.

Referring back to FIGS. 2 and 3, such profile data as described above is transmitted from a data inputting device 33 into a predetermined area of the RAM 31 by way of an input/output interface 32.

Also connected to the CPU 30 are the linear motor driving circuit 40 for driving the linear motor 3, the piezoelectric actuator driving circuit 60 for driving the piezoelectric actuator 1, the Z-axis motor driving circuit 36 for driving the Z-axis motor 18, and the spindle motor driving circuit 35 for driving the spindle motor 19.

Figure 9:
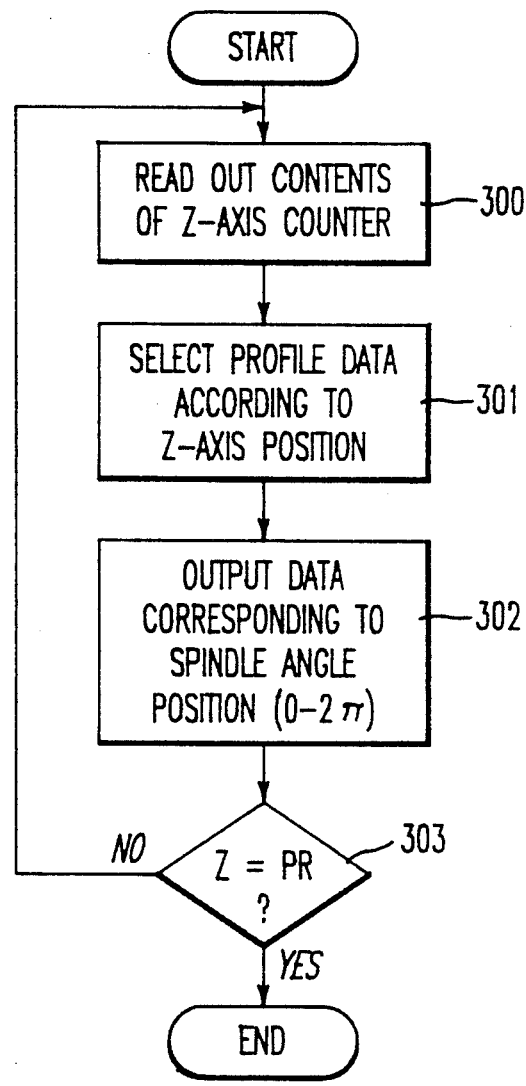
FIG. 9 is a flow chart illustrating the process of memory controller 41 and 61 when the machining apparatus machines the workpiece.

Referring particularly to FIG. 3, a detailed construction of the linear motor driving circuit 40 and the piezoelectric actuator driving circuit 60 is shown. The linear motor driving circuit 40 includes a memory controller 41 connected to the CPU 30 for controlling address designation and data to be inputted to or outputted from a profile data memory 42. As illustrated in FIG. 12, multiple storage areas are formed in the profile data memory 42. Stored in the storage areas are low frequency component of profile data (hereinafter referred to as low frequency profile data) of sections $P_A$ to $P_F$ and low frequency profile data of plural intermediate sections. As stated below, CPU calculates the low frequency profile data for each of the sections $P_A$ to $P_F$ and the low frequency profile data for each of plural intermediate sections located between selected two adjacent sections of the sections $P_A$ to $P_F$ based on the profile data of each of the sections $P_A$ to $P_F$ stored in the profile data area 312 and stores the calculated low frequency profile data in the profile data memory 42 by way of the memory controller 41. As is evident from the above description, the each low frequency profile data is composed of multiple components $\Delta XT_L(\theta)$ corresponding to multiple rotary angle positions of the spindle 17. Meanwhile, the memory controller 41 receives C-axis present position data and Z-axis present position data which are output from the C-axis position counter 211 and Z-axis position counter 201, respectively. The C-axis present position data indicates the angular position of the spindle 17. As shown in FIG. 9, the memory controller 41 reads out the output of the Z-axis position counter 201 (step 300) and selects the storage area in which the low frequency profile data corresponding to the Z-axis position is stored (step 301). Then, each time the spindle 17 is rotated over a predetermined angle (for example, 0.5 degrees), the count value of the X-axis position counter 211 is updated. Each time the count value of the X-axis position counter 211 is updated, the memory controller 41 reads out a component $\Delta XT_L(\theta)$ of low frequency profile data stored in the selected memory area of the profile data memory 42 (step 302). Namely, a component $\Delta XT_L(\theta)$ stored at an address thereof corresponding to a current angular position of the spindle 17, is outputted as a parallel signal of 12 bits to a terminal A of a full adder 43 by way of the memory controller 41.

The linear motor driving circuit 40 further includes an incremental movement amount pulse generator 51 also connected to the CPU 30. The pulse generator 51 generates a pulse signal for varying the reference position Xs of the profile generating movement in response to an instruction from the CPU 30. The position of a maximum radius of a workpiece W is selected, for example, as the reference position Xs. Accordingly, if the workpiece W has a barrel-like shape, then the reference position Xs makes a function of the Z-coordinate. The reference position Xs of the profile generating movement can be varied arbitrarily with such pulse signal. Accordingly, the cutting tool T is caused to make profile generating movement with respect to the reference position Xs by the linear motor 3 and the piezoelectric actuator 1, and such profile generating movement can be offset by varying the reference position Xs. In other words, a workpiece can be cut-in by varying th reference position Xs. Also, a similar shape having a different size can be machined. Further, if the reference position Xs is varied in a synchronized relationship with movement in the Z-axis direction, then a workpiece can be machined, for example, into a conical shape having sectional shapes having a fixed profile.

An incremental movement pulse signal developed from the incremental movement amount pulse generator 51 is transmitted to a 20-bit counter 47. The counter 47 decrements the current count value thereof in response to an input pulse corresponding to movement in the positive direction of the X-axis but increments the current count value thereof in response to an input pulse corresponding to movement in the negative direction of the X-axis. Output of the counter 47 is coupled to a terminal A of a 20-bit full adder 48. Thus, an output value of the counter 47 is a 20-bit parallel signal and represents an aimed control position then. Normally, a corresponding number of pulse signals are outputted from the incremental movement amount pulse generator 51 in order to position the tool origin position Xo to the predetermined reference position Xs. The tool origin position Xo coincides with the position of the tool end TP when the relative end position Xv is equal to zero, that is, when the piezoelectric actuator 1 remains at the origin. Then, at a point of time when the outputting of the pulse signal is completed, the output value of the 20-bit counter 47 is held at the reference position Xs.

On the other hand, a feedback pulse signal of the linear encoder 87 for detecting an amount of movement of the linear motor 3 is transmitted to another 20-bit counter 46. The counter 46 increments the current count value thereof in response to an input pulse corresponding to movement in the positive direction of the X-axis but decrements the current count value thereof in response to an input pulse corresponding to movement in the negative direction of the X-axis. Output of the 20-bit counter 46 is coupled to a terminal B of the 20-bit full adder 48. An output value of the 20-bit counter 46 is a 20-bit parallel signal and represents a current position of the tool origin Ov.

Accordingly, a deviation between the aimed control position and the current position is calculated by the 20-bit full adder 48 and is transmitted to a complementary number converting circuit 52 which has a function of inverting each bit of a received signal and adding "1" to the value after such inversion. Output of the complementary number converting circuit 52 is coupled to a terminal B of the full adder 43. Accordingly, a value obtained by subtracting an output of the full adder 48 from a value received at the terminal A is outputted from the full adder 43. Output of the full adder 43 is converted into a voltage value by a digital to analog (D/A) converter 44 and transmitted to a servo amplifier 45. The servo amplifier 45 amplifies a deviation between a voltage value received from the D/A converter 44 and an output voltage of the F/V converter 88, and the linear motor 3 is driven at a speed corresponding to an output of the servo amplifier 45. Since the full adder 43 is included in a position feedback loop, the linear motor 3 is positioned to such a position that the output of the full adder 43 may be equal to zero. In particular, when no low frequency profile data $\Delta XT_L(\theta)$ is received from the terminal A of the full adder 43, the tool origin Ov is positioned to the reference position Xs which is a final aimed position to be outputted from the incremental movement amount pulse generator 51.

Then, after the tool position Ov is positioned to the reference position Xs and the output of the full adder 48 is reduced to zero, outputting of the low frequency profile data $\Delta XT_L(\theta)$ from the profile data memory 42 is instructed by an instruction from the CPU 30. The low frequency profile data $\Delta XT_L(\theta)$ are transmitted to the terminal A of the full adder 43 in synchronism with rotation of the spindle 17. Then, the linear motor 3 is driven in accordance with a deviation between the two inputs to the full adder 43. Also then, a feedback pulse is developed from the linear encoder 87, and a current deviation $\Delta X_R(\theta)$ of a current position $X_R(\theta)$ of the tool origin $X_O$ with respect to the reference position Xs is developed from the full adder 48. Output of the full adder 43 is thus equal to $\Delta XT_L(\theta) - \Delta X_R(\theta)$.

Since the current position of the tool origin Ov is controlled by the linear motor 3 so that the output of the full adder 43 may be equal to zero, it is controlled followingly to a position represented by the low frequency profile data $\Delta XT_L(\theta)$ after all.

Generally, the output value of the full adder 43 is given by $$\Delta XT_L(\theta) + X_S(\theta) - X_R(\theta) \tag{8}$$

Since the current position of the tool origin Ov is positioned so that the output value of the full adder 43 may be equal to zero, it follows an aimed position given by $\Delta XT_L(\theta) + X_S(\theta)$.

On the other hand, the piezoelectric actuator driving circuit 60 includes a profile data memory 62 connected to the CPU 30 by way of a memory controller 61. Constructions and functions of the memory controller 61 and profile data memory 62 of the piezoelectric actuator driving circuit 60 are similar to those of the memory controller 41 and profile data memory 42 of the linear motor driving circuit 40. The profile data memory 62 has stored therein high frequency profile data $\Delta XT_F(\theta)$ each of which represents a relative position of the tool end TP assigned to the piezoelectric actuator 1 with respect to the tool origin position Xo. High frequency profile data $\Delta XT_F(\theta)$ outputted from the profile data memory 62 by way of the memory controller 61 are inputted to a digital to analog (D/A) converter 63 and converted into an analog voltage value by the latter. Output of the D/A converter 63 is coupled to a differential amplifier 64. As illustrated in FIG. 12, multiple storage areas are formed in the profile data memory 62. Stored in the storage areas are high frequency component of profile data (hereinafter referred to as high frequency profile data) of sections $P_A$ to $P_F$, and high frequency profile data of plural intermediate sections. As stated below, CPU calculates the high frequency profile data for each of the sections $P_A$ to $P_F$ and the high frequency profile data for each of the plural intermediate sections between selected two sections based on the profile data of each of the sections $P_A$ to $P_F$ stored in the profile data area 312, and stores the calculated high frequency profile data in the profile data memory 62 by way of the memory controller 61. The each high frequency profile data is composed of multiple components $\Delta XT_F(\theta)$ corresponding to multiple rotary angle positions of the spindle 17. As shown in FIG. 9, the memory controller 61 reads in the output of the z-axis position counter 201 and selects the storage area in which the high frequency profile data corresponding to the Z-axis position is stored. The memory controller 61 reads out the component $\Delta XT_F(\theta)$ of the high frequency profile data in the selected memory area successively in the synchronism with increment of the C-axis position counter 211 and outputs the component $\Delta XT_F(\theta)$ to the D/A converter 63.

An output of a displacement sensor 86 for detecting a displacement of the piezoelectric actuator 1 is amplified by a DC amplifier 66 and then transmitted to the differential amplifier 64. An output of the DC amplifier 66 represents a current relative position $XvR(\theta)$ of the tool end TP with respect to the tool origin Ov. Accordingly, an output of the differential amplifier 64 has a value equal to $\Delta XT_F(\theta) - XvR(\theta)$. Such output of the differential amplifier 64 is amplified by an amplifying circuit 65 and then applied to the piezoelectric actuator 1. Consequently, the piezoelectric actuator 1 is displaced in accordance with the voltage applied thereto so that the relative position of the tool end TP with respect to the tool origin Ov is varied. Since the differential amplifier 64 forms part of a position feedback loop, the piezoelectric actuator 1 is displaced so that the output of the differential amplifier 64 may be equal to zero. Accordingly, the current relative position $XvR(\theta)$ of the tool end TP with respect to the tool origin Ov follows an instructed value of the profile data $\Delta XT_F(\theta)$.

A method of separating the profile data $\Delta XT(\theta)$ into the profile data $\Delta XT_L(\theta)$ for the linear motor 3 and the profile data $\Delta XT_F(\theta)$ for the piezoelectric actuator 1 is executed by means of the fourier transformation according to the process of the CPU 30.

The profile data $\Delta XT(\theta)$ are prepared with respect to each of sections $P_A$ to $P_F$ of constant pitches p, as shown in FIG. 6 and are inputted to the profile data area 312 of the RAM 21 through the CPU30, an input/output interface 32 and data inputting device 33.

It is to be noted that the sectional shape changes between section $P_A$ and $P_F$, but does not change between section $P_F$ and $P_R$.

A method of creating the profile data for j plural intermediate sections based on the profile data of the sections $P_A$ to $P_F$ will be described below.

Figure 7A:
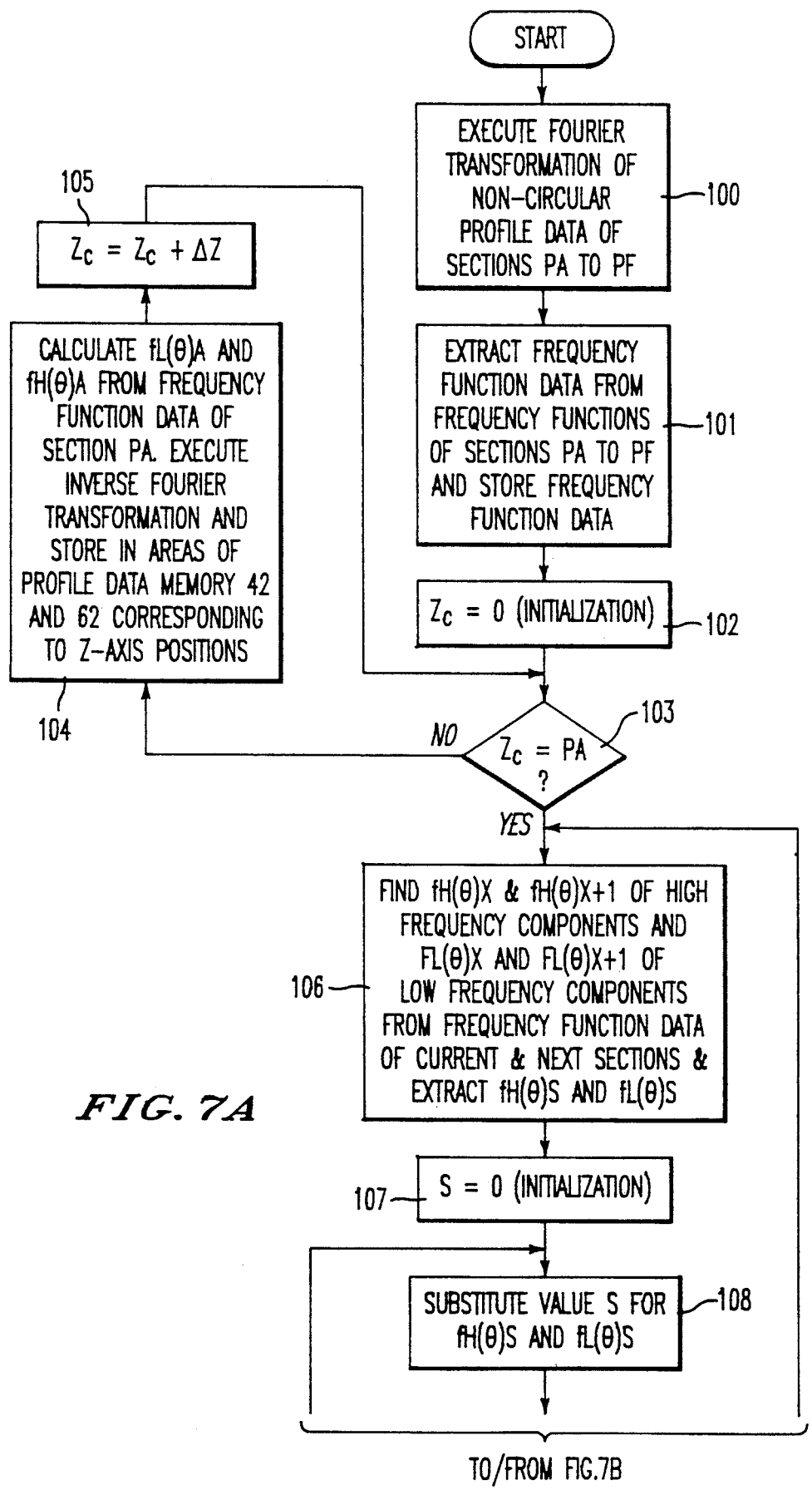
FIG. 7(A) and FIG. 7(B) are flow charts illustrating procedures of creating transient profile data by means of a proportional distribution method.
Figure 7B:
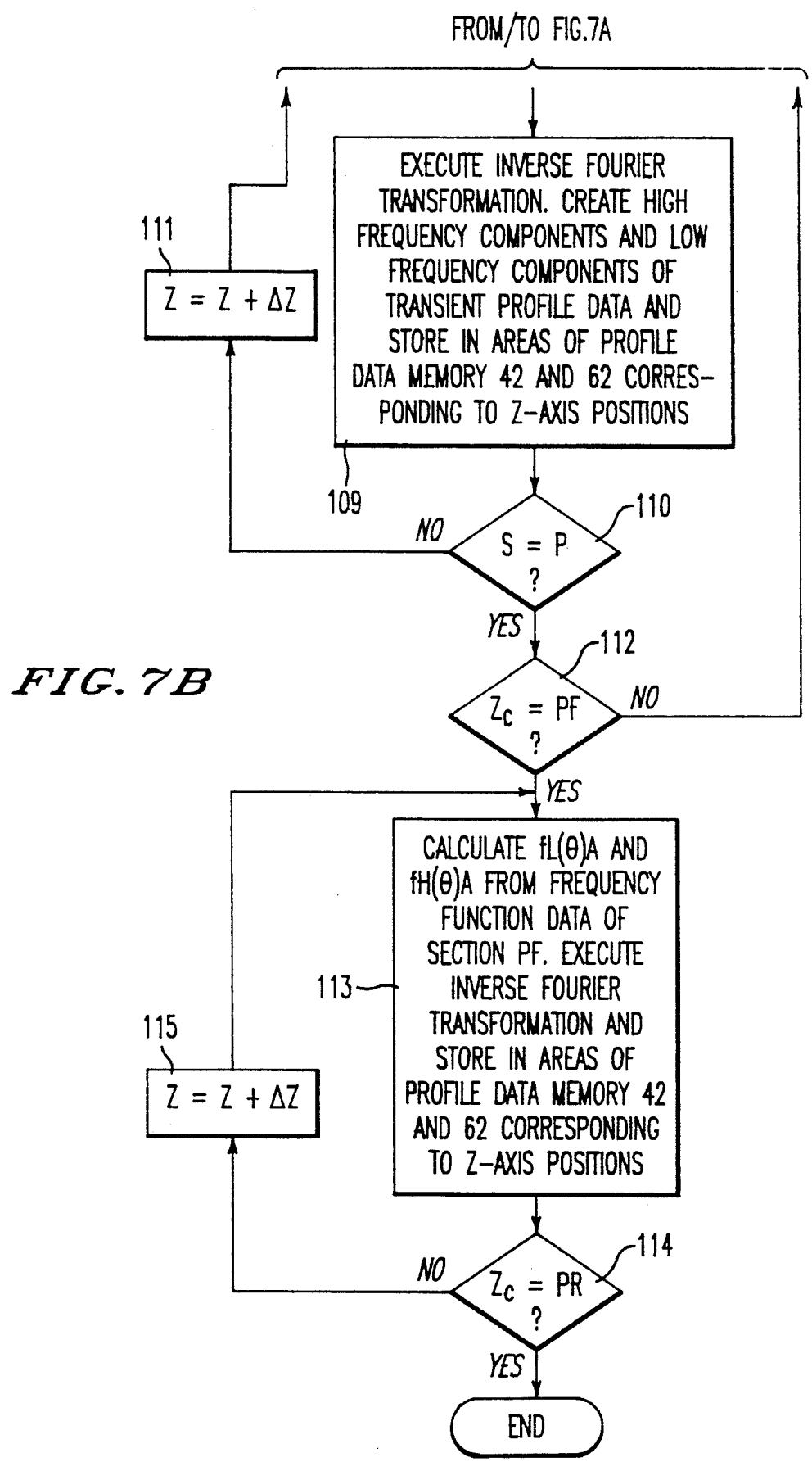

The process of the CPU is described with respect to the case that the profile data for plural intermediate sections are created by the proportional distribution based on the profile data of two selected sections. FIG. 7(A) and FIG. 7(B) are a flow charts illustrating the above process of the CPU.

Referring to FIG. 7(A) and FIG. 7(B), at first at step 100, executed is the fourier transformation of the profile data of the each section $P_A \ldots P_F$ stored in the profile data area 312 to find a frequency function which is a function of a rotary angular velocity $\omega$ of the spindle 17.

The section $P_A$ is given by the following expression:

$$f(\theta)_A = a_0 + a_1 \cos(2\omega t + \rho_1) + \\ a_2 \cos(4\omega t + \rho_2) + a_3 \cos(6\omega t + \rho_3) + \\ a_4 \cos(8\omega t + \rho_4) + a_5 \cos(10\omega t + \rho_5) + \\ a_6 \cos(12\omega t + \rho_6)$$

The section $P_B$ is given by the following expression:

$$f(\theta)_B = b_0 + b_1 \cos(2\omega t + \gamma_1) + \\ b_2 \cos(4\omega t + \gamma_2) + b_3 \cos(6\omega t + \gamma_3) + \\ b_4 \cos(8\omega t + \gamma_4) + b_5 \cos(10\omega t + \gamma_5) + \\ b_5 \cos(12\omega t + \gamma_6)$$

$(\theta = \omega t)$

Subsequently, the sections $P_C$ to $P_F$ are given in such a manner as given by the above expressions as the frequency functions $f(\theta)_C \ldots f(\theta)_F$ which are functions of $\omega$. Then at step 101 the frequency function data of each of the sections $P_A \ldots P_F$ are extracted and stored. In case of the section $P_A$, the frequency function data are the coefficients representing the frequency function $f(\theta)_A$, namely $a_0, a_1 \ldots a_6$ and $\rho_1, \rho_2 \ldots \rho_0$. In case of the sections $P_B \ldots P_F$, the frequency function data are the coefficients thereof. At step 102 initialization is executed by setting an internal counter for Z-axis to zero. The internal counter is used for indicating Z-axis position $Z_C$ of tool T with respect to the Z-axis origin. Therefore, the tool T is presumed to be moved from the Z-axis origin, as shown in FIG. 6. The process advances to step 103, at which it is judged whether or not a Z-axis position $Z_C$ indicated by the internal counter coincides with the section $P_A$. If the judgment at step 103 is No, at step 104 calculated from the frequency function data of the section $P_A$ are $$f_H(\theta)_A = \sum_{K=2}^{6} a_k \cos(2\omega kt + \rho K)$$

which is high frequency function and $f_L(\theta)_A = a_0 + a_1 \cos(2\omega t + \rho_1)$ which is low frequency function, and an inverse fourier transformations of the high and the low frequency functions are executed to obtain high frequency profile data and low frequency profile data, then the high and the low frequency profile data are stored in areas, corresponding the to Z-axis position, of the profile data memory 42 and 62, respectively. Then at step 105 Z axis position is set as $Z_C = Z_C + \Delta Z$ and the process returns to step 103 and steps 104 to 105 are repeated till it is judged at step 103 that $Z_C = P_A$. In case it is judged at step 103 that $Z_C = P_A$, at step 106 the high frequency functions $f_H(\theta)_X$ and $f_H(\theta)_X + 1$ and the low frequency functions $F_L(\theta)_X$ and $f_L(\theta)_{X+1}$ are found from the frequency function data of the adjacent sections of the sections $P_A \ldots P_F$, respectively. For example, the sections $P_A$ and $P_B$ (see FIG. 6) are given by the following expressions:

$$f_H(\theta)_A = \sum_{K=2}^{6} a_k \cos(2\omega Kt + \rho_k) \quad (9)$$

$$f_H(\theta)_B = \sum_{K+2}^{6} b_k \cos(2\omega kt + \gamma_k) \quad (10)$$

$$f_L(\theta)_A = a_0 + a_1 \cos(2\omega t + \rho_1) \quad (11)$$

$$f_L(\theta)_B + b_0 + b_1 \cos(2\omega t + \gamma_1) \quad (12)$$

The proportional distribution is executed for a difference in a term of a fixed number k, a difference in amplitude Am and a difference in a phase ph in a proportion of (movement position of the tool)/(pitch p between the sections). That is, the expressions are as follows:

$$k = (b_o - a_o) \times S/p$$

$$A_m = (b_n - a_n) \times S/p (n=1 \ldots 6),$$

and $$p_h = (\gamma_n - \rho_n) \times S/p (n=1 \ldots 6).$$

According to the above expressions, the high frequency function $f_H(\theta)_S$ and the low frequency function $f_L(\theta)_S$ for an intermediate section are given by the following expressions:

$$f_H(\theta)_S = \sum_{K=2}^{6} \{a_k + (b_k - a_k) \times S/P\} \times$$
$$\cos[2\omega kt + \{\rho_k + (\gamma_k - \rho_k) \times S/p\}]$$

$$f_L(\theta)_S = a_0 + (b_0 - a_0) \times S/p + \{a_1 + (b_1 - a_1) \times S/P\} \times$$
$$\cos[2\omega t + \{\rho_1 + (\gamma_1 - \rho_1) \times S/p\}]$$

$(S =$ $vt$; $v$ is movement velocity of the tool $T$ in the Z-axis direction)

$(\theta = \omega t)$

At step 107, the movement distance S of the tool from a previous section in the Z-axis direction is initialized as S=0. At step 108 the value of S is substituted for the high frequency function $f_H(\theta)_S$ and the low frequency function $f_L(\theta)_S$, respectively. The process advances to step 109, at which the fourier transformation is executed to create the high frequency profile data $\Delta XT_F(\theta)$ and the low frequency profile data $\Delta XT_L(\theta)$, which are stored in areas corresponding to the Z-axis positions of the profile data memories 42 and 62, respectively.

Steps 108 to 109 are repeated while at step 111 value s is incremented by $\Delta Z$ until it is judged at step 110 that $S=p$ (P=pitch between the selected two sections). Till it is judged at step 112 that the Z-axis position $Z_C$ of the tool corresponds with the position $P_F$, steps 106 to 111 are repeated to create the plural profile data for intermediate sections between the sections $P_A$ and $P_F$. Then at step 113 the high frequency functions $f_H(\theta)_F$ and the low frequency functions $f_L(\theta)_F$ for intermediate sections between $P_F$ and $P_R$ are calculated from the frequency function data of the section $P_F$ and the inverse fourier transformation is executed to obtain low frequency profile data $\Delta XT_L(\theta)$ and the high frequency profile data $\Delta XT_H(\theta)$. These profile data are stored in the areas corresponding to the Z-axis positions of the profile data memory 42 and 62, respectively. The process advances to step 114. Until it is judged at step 114 that the Z-axis position of the tool equals to a machining stop position, namely $P_R$ the process of step 113 is executed after increment of Z-axis position by the predetermined amount $\Delta Z$ at step 115. In this way, the profile data for intermediate sections between the adjacent sections can be found by means of the proportional distribution.

Figure 8:
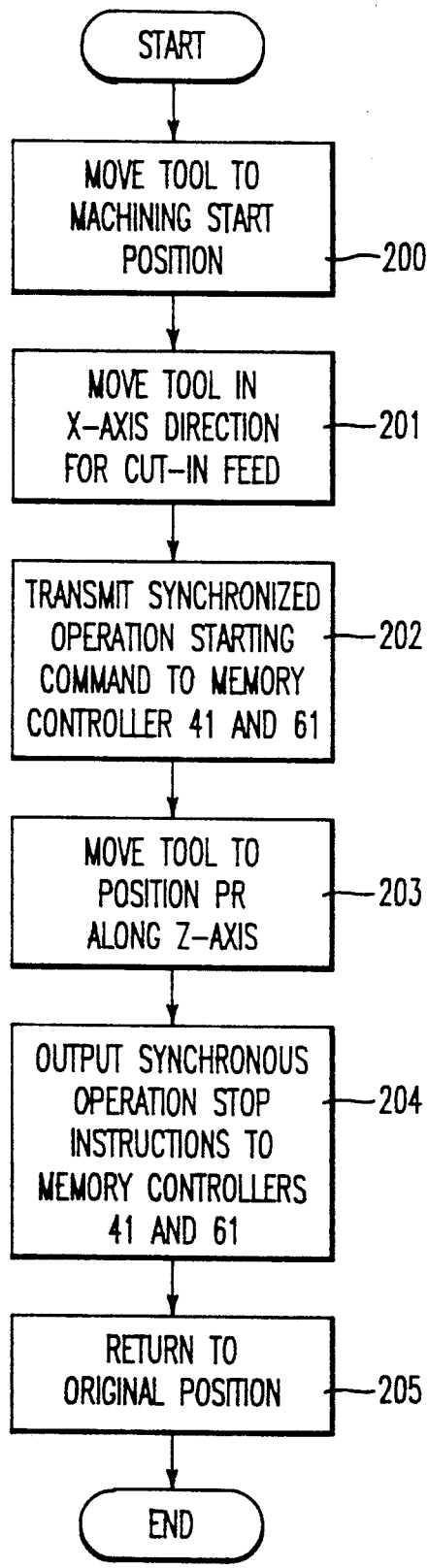
FIG. 8 is a flow chart illustrating the process of the CPU when the machining apparatus machines the workpiece.

FIG. 8 is a flow chart showing the process of CPU 30 during the machining operation.

In step 200, tool T is moved to the machining start position shown in FIG. 6. In step 201, tool T is moved from the machining start position toward the workpiece W in the X-axis direction to accomplish a radial cut-in feed. Then, the process continues to step 202 wherein the CPU 30 outputs a synchronous rotation start instructions to memory controllers 41 and 61. In step 203, the CPU 30 outputs Z-axis command pulses to Z-axis motor driving circuit 36 so as to move the tool T along the Z-axis to the machining stop position $P_R$, and in step 204, the CPU 30 outputs a synchronous operation stop instructions to the memory controllers 41 and 61. After that, the CPU 30 outputs Z-axis command pulses to the Z-axis motor driving circuit 36 so as to return the tool T.

FIG. 9 is a flow chart showing the operation of memory controllers 41 and 61 during machining operation. When the synchronous operation start instructions are output from the CPU 30, the memory controllers 41 and 61 execute following process.

In step 300, the output of Z-axis position counter 201 is read. In step 301, memory areas corresponding to the absolute position of the tool T in the Z-axis are selected. In step 302, high frequency profile data and low frequency profile data corresponding to the angular position detected by Z-axis position counter 211 are respectively read from the selected memory areas of the profile data memories 42 and 62. The processes in the previously described steps 300 and 301 are repeated until the synchronous operation stop instructions are output from the CPU 30.

The linear motor 3 and the piezoelectric actuator 1 are driven according to the low frequency profile data and the high frequency profile data corresponding to the Z-axis position of the tool in combination so that the tool T is moved along Z-axis with back and forth movement in X-axis direction.

Then, according to change in the Z-axis position of the tool, the different low and the high frequency profile data are selected successively, thereby moving the tool. Thus, the piston whose sectional profile varys with respect to the axial position is machined.

Next, the creation of the intermediate profile data between sections by spline interpolation using mix function are described hereinafter.

Spline interpolation by mix function is characterized by:

(1) generating interpolation formula connecting four continuous points in a single group, and using area between two center points;
(2) Always passing the given points;
(3) secondary derivatives are consistent at data points (given as data points).

The interpolation method seeks mix function passing four continuous points $(X_{n-1}, Y_{n-1})$, $(X_n, Y_n)$, $(X_{n+1}, Y_{n+1})$, $(X_{n+2}, Y_{n+2})$, joining points [n] and [n+1], then, seeking the mix function passing four points [n], [n+1], [n+2] and [n+3], and joining points [n+1] and [n+2]. Thus, successive data point are interpolated, and the mix functions are defined as using a parameter [μ] as follows:

$$x = -u(u-1)(u-2)x_0/6 + (u+1)(u-1)(u-2)x_1/2 - \quad (13)$$
$$(u+1)u(u-2)x_2/2 + (u+1)u(u-1)x_3/6$$

$$y = -u(u-1)(u-2)y_0/6 + (u+1)(u-1)(u-2)y_1/2 - \quad (14)$$
$$(u+1)u(u-2)y_2/2 + (u+1)u(u-1)y_3/6$$

When the four points $X_{n-1}$, $X_n$, $X_{n+1}$, $X_{n+2}$ are substituted for the successive values $X_0$, $X_1$, $X_2$ and $X_3$ in the aforesaid Equation (13), the values are sought in the cases of [u]=0 and 1, $X(0)=X_n$ and $X(1)=X_{n+1}$. Similarly, in Equation (14), the values when [u]=0 and 1 are $Y(0)=Y_n$ and $Y(1)=Y_{n+1}$. The aforesaid values represent the respective data points $(X_n, Y_n)$ and $(X_{n+1}, Y_{n+1})$. The X and Y values obtained by changing the parameter [u] between 0 and 1 are the data actually used. The interval between adjoining data points is normalized at 1 using the [u] parameter.

Figure 11A:
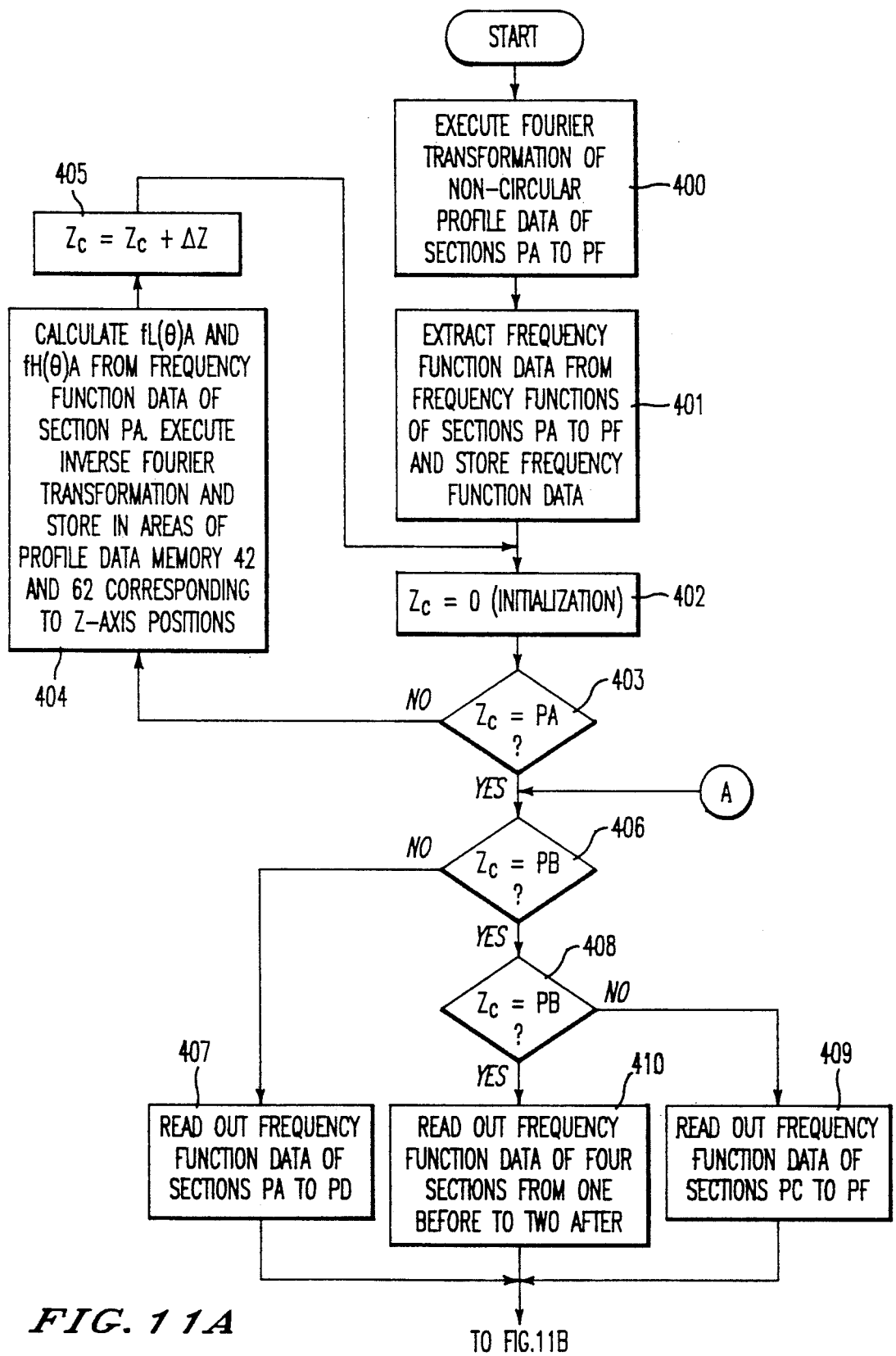

FIG. 11(A) and FIG. 11(B) are flow charts showing the processing of the CPU 30 when profile data of intermediate sections are created by the previously described technique of spline interpolation.

First, in step 400, profile data of section $P_A$ through $P_F$, which are stored in the RAM 31, are subjected to fourier transformation, and the respective frequency functions are sought that are the functions of angular rotational speed ω of the spindle 17.

The section $P_A$ is expressed as $$f(\theta)_A = a_0 + a_1 \cos(2\omega t + \rho_1) +$$
$$a_2 \cos(4\omega t + \rho_2) + a_3 \cos(6\omega t + \rho_3) +$$
$$a_4 \cos(8\omega t + \rho_4) + a_5 \cos(10\omega t + \rho_5) +$$
$$a_6 \cos(12\omega t + \rho_6)$$

and the section $P_B$ is expressed as $$f(\theta)_B = b_0 + b_1 \cos(2\omega t + \gamma_1) +$$
$$b_2 \cos(4\omega t + \gamma_2) + b_3 \cos(6\omega t + \gamma_3) +$$
$$b_4 \cos(8\omega t + \gamma_4) + b_5 \cos(10\omega t + \gamma_5) +$$
$$b_5 \cos(12\omega t + \gamma_6)$$

(where $\theta = \omega t$).

Similarly, sections $P_C$ through $P_F$ are expressed as frequency functions $f(\theta)_C$ through $f(\theta)_F$, which are the functions of ω.

Next, in step 401, the frequency function data for each section $P_A$ through $P_F$ are derived and stored in memory. The frequency function data, for example relative to section $P_A$, are the coefficients $a_0, a_1 \ldots a_6, \rho_1, \rho_2 \ldots \rho_6$ expressing the frequency function $f(\theta)_A$. The sections $P_A$ through $P_F$ are similarly treated. In step 402, the internal counter indicating Z axis position $Z_C$ is initially set to zero. The process continues to step 403 where a determination is made as to whether or not the Z-axis position $Z_C$ indicated by the internal counter coinsides with the Z-axis position of section $P_A$ position. If the result of the check in step 403 is NO, the process continues to step 404 and the high-frequency function $$f_H(\theta)_A = \sum_{K=2}^{6} a_K \cos(2\omega k t + \rho_K)$$

and the low frequency function $f_L(\theta)_A = a_0 + a_K \cos(2\omega t + \rho_1)$ are calculated from the frequency function data of the aforesaid section $P_A$, and the results are subjected to inverse-fourier transformation to obtain the high and low frequency profile data which are then stored in profile data memories 42 and 62 in the areas corresponding to the Z-axis position. Then, in step 405, Z is set to $Z=\Delta Z$, and steps 404 and 405 are repeated until the Z-axis position $Z_C$ coinsides with that of section $P_A$, whereupon the process returns to step 403.

When the check in step 403 determines that $Z=P_A$, a determination is made in step 406 as to whether or not the Z-axis position $Z_C$ indicated by the counter reaches the Z-axis position of the section $P_E$. If the relation is not satisfied, the process continues to step 407 where frequency data are read for four individual section $P_A$ through $P_D$, and thereafter the process continues to step 411 which is described later. If $Z_C \geq P_E$ in step 406, a check is made in step 408 to determine if $Z_C \geq P_E$, and if $Z_C \geq P_E$ does not obtain, the process continues to step 409 where the frequency function data are read for four individual sections $P_C$ through $P_F$, and the process then continues to step 411. If the check in step 408 determines that $Z_C \geq P_E$, then in step 410 the frequency function data are read for four sections including one section located before the current Z-axis position and two sections located after the current position, the process of step 411 thereafter is executed.

In step 411, the constant term K, amplitude AM and phase PH derived from the frequency function data read in the aforesaid steps 407, 409 and 410 are used to derive interpolations fK, fAM and fPH through the previously mentioned mix functions.

The sections $P_A$ through $P_D$ are described in detail hereinafter. The high and low frequency functions expressing each section $P_A$ through $P_D$ are:

$$f_H(\theta)_A = \sum_{k=2}^{6} a_k \cos(2\omega k t + \rho_k)$$

$$f_H(\theta)_B = \sum_{k=2}^{6} b_k \cos(2\omega k t + \gamma_k)$$

$$f_H(\theta)_C = \sum_{k=2}^{6} c_k \cos(2\omega k t + \phi_k)$$

$$f_H(\theta)_D = \sum_{k=2}^{6} d_x \cos(2\omega k t + \eta_x)$$

$$f_L(\theta)_A = a_0 + a_1 \cos(2\omega t + \rho_1)$$

$$f_L(\theta)_B = b_0 + b_1 \cos(2\omega t + \gamma_1)$$

$$f_L(\theta)_C = c_0 + c_1 \cos(2\omega t + \phi_1)$$

$$f_L(\theta)_D = d_0 + d_1 \cos(2\omega t + \eta_1)$$

Interpolations are made using mix functions for each of the profile data of constant item K, amplitude AM and phase PH of sections $P_A$ through $P_D$.

Interpolation function fK for constant item K becomes $$fK = -u(u-1)(u-2)a_0/6 + (u+1)(u-1)(u-2)b_0/2 - (u+1)u(u-2)c_0/2 + (u+1)u(u-1)d_0/6$$

and the interpolation function fAM for amplitude AM becomes $$fAM = -u(u-1)(u-2)a_n/6 + (u+1)(u-1)(u-2)b_n/2 - (u+1)u(u-2)c_n/6 + (u+1)u(u-1)d_n/2$$

(where n is an integer 1 through 6), and the interpolation function fPH for phase PH becomes $$fPH = -u(u-1)(u-2)\rho_n/6 + (u+1)(u-1)(u-2)\gamma_n/2 - (u+1)u(u-2)\phi_n/6 + (u+1)u(u-1)\eta_n/2$$

(where n is an integer 1 through 6). In step 412, the movement amount [S] from the previous section in the Z-axis direction is initially set to zero, and in step 413, the parameter [u] corresponding to the [S] value is calculated using following equation: U=S/P (P:Pitch of sections). The calculated parameter [u] is substituted in the interpolation functions fK, fAM and fPH. When $P_A < Z_C \leq P_B$, parameter [u] is set at u=u−1, and when $P_E < Z_0 \leq P_F$, parameter [u] is set at u=u+1. Next, in step 414, the high-frequency functions $f_H(\theta)_S$ and low frequency functions $f_L(\theta)_S$ for an intermediate section are determined as described hereinafter.

$$f_H(\theta)_S = \sum_{k=2}^{6} [(-U_0 a_k + U_1 b_k - U_2 c_k + U_3 d_k)\cos\{2\omega kt + (-U_0 \rho_k + U_1 \gamma_k = U_2 \phi_k + U_2 \eta_k)]$$

$$f_L(\theta)_S = (-U_0 a_0 + U_1 b_0 - U_2 c_0 + U_3 d_0) + (-U_0 a_1 + U_1 b_1 - U_2 c_1 + U_3 d_1)\cos\{2\omega t + (-U_0 \rho_1 + U_1 \gamma_1 - U_2 \phi_1 + U_3 \eta_1)\}$$

where $U_o = u(u-1)(u-2)/6$ $U_1 = (u+1)(u-1)(u-2)/2$ $U_2 = (u+1)u(u-2)/2$ $U_3 = (u+1)u(u-1)/6$ In step 415, the high-frequency function $f_H(\theta)_S$ and the low-frequency function $f_L(\theta)_S$ derived in step 414 are subjected to inverse fourier transformation, the high-frequency profile data and the low-frequency profile data are created for the intermediate section, and the profile data are stored in areas of profile data memories 42 and 62.

Until a determination is made that S=p (p=the pitch between specified sections) in step 416, S is set at S=S+ΔZ in step 417, and steps 413 through 415 are repeated until the value S=P is reached. Until a determination is made that the present position in the Z-axis direction reaches the position $P_F$ in step 418, the previously described steps 408 through 417 are repeated, and intermediate profile data are created corresponding to plural intermediate sections between the section $P_A$ and $P_F$. In step 419, the high-frequency function $f_H(\theta)_F$ and the low-frequency function $f_L(\theta)_F$ are calculated from the frequency function data for section $P_F$, then subjected to inverse-fourier transformation, and the profile data are stored in profile data memories 42 and 62 corresponding to the Z-axis position. The process continues to step 420. Until a determination is made that $Z_C = P_R$ ($P_R$=the machining stop position) in step 420, Z is a set at $Z_0 = Z_0 + \Delta Z$ in step 421, and processing continues in step 420. Accordingly, the transient profile data for plural intermediate sections after section $P_F$ is determined by the technique of spline interpolation.

The process of the CPU 30 during the machining operation based on the profile data determined by the spline interpolation technique is identical to that of the previously described first embodiment. Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An apparatus for machining a non-circular workpiece wherein a workpiece is rotated at an angular velocity and a cutting tool is moved in a direction perpendicular to the rotational axis of the workpiece and a direction parallel to the rotational axis in a synchronized relationship with the rotation of the workpiece so that the workpiece may be machined into a non-circular shape whose sectional shape changes with respect to its axial position, said apparatus comprising:

a first data storage means for storing therein non-circular profile data of plural sections perpendicular to the rotational axis of the workpiece, a data transformation means for transforming the stored non-circular profile data for each of the plural sections into a frequency function of 1 to n degree which is a function of said angular velocity, a calculation means for finding an amplitude and a phase of each degree of frequency function for each of intermediate sections between adjacent ones of said plural sections by means of an interpolation according to a position between selected ones of said plural sections based on the amplitude and the phase of the each degree of the frequency function of each of the selected ones of said plural sections and for obtaining low frequency functions and high frequency functions, a data inverse transformation means for transforming inversely the high frequency function and the low frequency function calculated by said calculation means to create a high frequency profile data and low frequency profile data, a first driving system driven in accordance with the high frequency profile data and, a second driving system driven in accordance with the low frequency profile data.

2. The apparatus for machining the non-circular workpiece as claimed in claim 1 wherein said second driving system driven in accordance with the low frequency profile data includes a linear motor while the first driving system driven in accordance with the high frequency profile data includes a piezoelectric actuator.

3. An apparatus for machining a non-circular workpiece wherein a workpiece is rotated at an angular velocity and a cutting tool is moved in a direction perpendicular to the rotational axis and a direction parallel to the rotational axis in a synchronized relationship with the rotation of the workpiece so that the workpiece may be machined into a non-circular shape whose sectional shape changes with respect to its axial position, said apparatus comprising: a first profile data storage means for storing therein non-circular profile data of plural sections perpendicular to the rotational axis of the workpiece in every fixed pitch in the axis direction of the workpiece.

a profile data transformation means for transforming the stored non-circular profile data into frequency functions of 1 to n degree which are functions of said rotary angular velocity.

a data selection means for selecting the frequency functions of selected two adjacent sections, a calculation means for calculating an amplitude and a phase of each degree of a frequency function for each of plural intermediate sections between the selected two sections by a proportional distribution according to a position between selected sections based on the amplitude and the phase of the each degree of the frequency function of each of the selected sections and for obtaining low frequency functions and high frequency functions, a data inverse transformation means for transforming inversely the high frequency function and the low frequency function calculated by said calculation means to create high frequency profile data and low frequency profile data, a second data storage means for memorizing the high frequency profile data and the low frequency profile data created by said data inverse transformation means, a first driving system driven in accordance with the high frequency profile data stored in the second profile data storage means, and a second driving system driven in accordance with the low frequency profile data stored in second profile data storage means.

4. The apparatus for machining the non-circular workpiece as claimed in claim 3 wherein the second driving system driven in accordance with the low frequency profile data includes a linear motor while the first driving system driven in accordance with the high frequency profile data includes a piezoelectric actuator.

5. An apparatus for machining a non-circular workpiece according to claim 4, wherein said second data storage includes a first memory for storing therein low frequency profile data which define position change of said tool by said linear motor in the direction perpendicular to the rotational axis of the workpiece with regard to an angle of rotation of the workpiece a first memory controller for successively outputting the low frequency profile data stored in said first memory as target control values for said linear motor in a synchronized relationship with rotation of the workpiece, a second memory for storing therein high frequency profile data which define position change of said tool by said piezoelectric actuator in the direction perpendicular to the axis of said workpiece with regard to an angle of rotation of the workpiece, and a second memory controller for successively outputting the high frequency profile data stored in said second memory as target control values for said piezoelectric actuator in a synchronized relationship with rotation of the workpiece.

6. An apparatus for machining a non-circular workpiece wherein a workpiece is rotated at an angular velocity and a cutting tool is moved in a direction perpendicular to the rotational axis and a direction parallel to the rotational axis in a synchronized relationship with the rotation of the workpiece so that the workpiece may be machined into a non-circular shape whose sectional shape changes with respect to its axial position, said apparatus comprising:

a first profile data storage means for storing therein non-circular profile data of plural sections perpendicular to the rotational axis of the workpiece in every fixed pitch in the axis direction of the workpiece, a profile data transformation means for transforming the stored non-circular profile data into frequency functions of 1 to n degree which are functions of said rotary angular velocity, a data selection means for selecting the frequency functions of selected two adjacent sections, a calculation means for calculating an amplitude and a phase of each degree of a frequency function for each of plural intermediate sections between the selected two sections by a spline interpolation according to a position between selected sections based on the amplitude and the phase of the each degree of the frequency function of each of the selected sections and for obtaining low frequency functions and high frequency functions, a data inverse transformation means for transforming inversely the high frequency function and the low frequency function calculated by said calculation means to create high frequency profile data and low frequency profile data, a second profile data storage means for memorizing the high frequency profile data and the low frequency profile data created by said data inverse transformation means, a first driving system driven in accordance with the high frequency profile data stored in the second profile data storage means, and a second driving system driven in accordance with the low frequency profile data store in the second profile data storage means.

7. The apparatus for machining the non-circular workpiece as claimed in claim 6 wherein the second driving system driven in accordance with the low frequency profile data includes a linear motor while the first driving system driven in accordance with the high frequency profile data includes a piezoelectric actuator 8. An apparatus for machining a non-circular workpiece according to claim 7, wherein said second data storage means includes:

a first memory for storing therein low frequency profile data which define position change of said tool by said linear motor in the direction perpendicular to the rotational axis of the workpiece with regard to an angle of rotation of the workpiece.

a first memory controller for successively outputting the low frequency profile data stored in said first memory as target control values for said linear motor in a synchronized relationship with rotation of the workpiece, a second memory for storing therein high frequency profile data which define position change of said tool by said piezoelectric actuator in the direction perpendicular to the axis of said workpiece with regard to an angle of rotation of the workpiece, and a second memory controller for successively outputting the high frequency profile data stored in said second memory as target control values for said piezoelectric actuator in a synchronized relationship with rotation of the workpiece.

* * * * *

UNITED STATES PATENT AND TRADEMARK OFFICE
CERTIFICATE OF CORRECTION

PATENT NO. : 5,229,951
DATED : JULY 20, 1993
INVENTOR(S) : Kazuhiko SUGITA et al It is certified that error appears in the above-indentified patent and that said Letters Patent is hereby corrected as shown below:

In column 9, line 22, delete "$\Delta \times T_F \theta$" and insert therefor -- $\Delta \times T_p \theta$ --;

In column 9, line 66, delete "j" before "Plural";

In column 10, line 28, delete "$b_5\cos$" and insert therefor -- $b_6\cos$ --;

In column 10, line 62, delete "the to Z-axis position: and insert therefor -- to the Z-axis position --;

In column 11, line 53, delete "$\Delta \times T_F (\theta)$" and insert therefor -- $\Delta \times T_H (\theta)$ --;

UNITED STATES PATENT AND TRADEMARK OFFICE
CERTIFICATE OF CORRECTION

PATENT NO. : 5,229,951
DATED : JULY 20, 1993
INVENTOR(S) : Kazuhiko SUGITA et al It is certified that error appears in the above-indentified patent and that said Letters Patent is hereby corrected as shown below:

In column 14, line 55, delete "$d_x \cos$" and insert therefor --$d_k \cos$ --;

In column 15, line 24, delete "$P_E < Z_o \leq P_F$" and insert therefor -- $P_E < Z_c \leq P_F$ --;

In column 15, line 32, delete "$(-U\rho_k + U_1 \tau \kappa = U_2 \phi \kappa + U_3 \eta \kappa\}]$" and insert therefor -- $(-U\rho_k + U_1 \tau \kappa - U_2 \phi \kappa + U_3 \eta \kappa\}]$ --

In column 16, line 1, delete "$Zo = Zo + \Delta Z$" and insert therefor -- $Zc = Zo + \Delta Z$ --.

Signed and Sealed this

First Day of November, 1994

BRUCE LEHMAN

*Attest:*

*Attesting Officer*   *Commissioner of Patents and Trademarks*